United States Patent
Chang et al.

(10) Patent No.: US 8,776,319 B1
(45) Date of Patent: Jul. 15, 2014

(54) PIN LOCKING DUAL SHAFT HINGE

(71) Applicant: Jarllytec Co., Ltd., New Taipei (TW)

(72) Inventors: Jui-Hung Chang, New Taipei (TW); Kuo-Tung Liao, New Taipei (TW)

(73) Assignee: Jarllytec Co., Ltd., New Taipei (TW)

( * ) Notice: Subject to any disclaimer, the term of this patent is extended or adjusted under 35 U.S.C. 154(b) by 0 days.

(21) Appl. No.: 14/180,762

(22) Filed: Feb. 14, 2014

(30) Foreign Application Priority Data

Mar. 5, 2013 (TW) .............................. 102204041 U

(51) Int. Cl.
*E05D 7/00* (2006.01)
*E05D 11/08* (2006.01)
*F16H 19/08* (2006.01)

(52) U.S. Cl.
CPC ..................................... *F16H 19/08* (2013.01)
USPC .................... 16/366; 16/342; 16/330; 16/303

(58) Field of Classification Search
USPC ........... 16/366, 368, 369, 340, 337, 334, 389, 16/357, 360, 361, 342, 330, 303; 361/679.6, 679.9, 679.17, 679.27; 248/917–923, 284.1; 379/433.12, 379/433.13; 455/575.1, 575.3, 575.4, 455/550.1, 90.3; 348/333.06, 373, 794
See application file for complete search history.

(56) References Cited

U.S. PATENT DOCUMENTS

| | | | | |
|---|---|---|---|---|
| 7,669,287 B2* | 3/2010 | Lee et al. | | 16/340 |
| 7,907,415 B2* | 3/2011 | Ueyama | | 361/749 |
| 8,296,905 B2* | 10/2012 | Zhang et al. | | 16/366 |
| 2007/0028419 A1* | 2/2007 | Lu et al. | | 16/366 |
| 2009/0000062 A1* | 1/2009 | Yamanami | | 16/366 |
| 2009/0070961 A1* | 3/2009 | Chung et al. | | 16/354 |
| 2011/0255221 A1* | 10/2011 | Ling | | 361/679.01 |
| 2011/0265288 A1* | 11/2011 | Chiang | | 16/341 |
| 2011/0289726 A1* | 12/2011 | Zhang et al. | | 16/250 |
| 2013/0016492 A1* | 1/2013 | Wang et al. | | 361/820 |
| 2013/0318746 A1* | 12/2013 | Kuramochi | | 16/342 |

FOREIGN PATENT DOCUMENTS

TW        M438797        10/2012

* cited by examiner

*Primary Examiner* — Chuck Mah
(74) *Attorney, Agent, or Firm* — Guice Patents PLLC

(57) ABSTRACT

The present invention relates to a pin locking dual shaft hinge, including a connecting support, a first core shaft and a second core shaft parallel to each other, a first engaging cam, a second engaging cam and an insertion pin. The connecting support includes a main body and a first connecting member disposed between an upper and a lower end thereof, the first connecting member is penetrated with a penetrated hole. The first core shaft and the second core shaft are respectively pivoted at the upper and lower end of the main body. The first engaging cam is sleeved and engaged on the first core shaft, the periphery of the first engaging cam is formed with at least a first engaging part. The second engaging cam is sleeved and engaged on the second core shaft, the periphery of second engaging cam is formed with at least a second engaging part.

14 Claims, 9 Drawing Sheets

PIN LOCKING DUAL SHAFT HINGE

BACKGROUND OF THE INVENTION

1. Field of the Invention

The present invention relates to a pin locking dual shaft hinge, especially to a hinge having dual shafts and capable of being rotated in 360 degrees and being applicable in a cover-lifting electronic device.

2. Description of Related Art

For allowing a general cover-lifting electronic product (e.g. a notebook computer, a mobile phone or an electrical book reader) to have its screen to be opened and rotated over 180 degrees (e.g. rotated to 360 degrees) relative to a main body thereof (the main body being installed with a keyboard) without generating interfere, a dual shaft hinge is therefore developed, take the Taiwan Patent No. M438797 granted to the applicant of the present invention for instance, the pulley pin locking dual shaft hinge includes a first rotation shaft, a second rotation shaft, a first connection sheet and a second connection sheet, the first rotation shaft is installed with a first engaging cam, the first engaging cam is formed with a concave part, the second rotation shaft is installed with a second engaging cam, the second engaging cam is formed with a concave part, a pulley is provided between the first connection sheet and the second connection sheet, the pulley is enable to be moveably mounted in the concave part of the first engaging cam or the concave part of the second engaging cam for limiting the action of the first rotation shaft or the action of the second rotation shaft; accordingly, the action order and manner of the rotation shaft can be ensured and the rotation stability for the electronic device for being folded or unfolded can be kept.

SUMMARY OF THE INVENTION

For allowing a cover-lifting electronic product to be easily carried around or stored by a user, the dimension thereof is designed to be thinner and smaller, so the internal space for installing a dual shaft hinge becomes very limited, in order to make the components of the dual shaft hinge to have a smaller dimension, a design of reducing the assembly procedure is required, so the structure of the dual shaft hinge itself can be easily adjusted (or the design thereof can be easily altered). When the pulley disclosed in the patent mentioned in prior art is desired to have its dimension to be adjusted for being reduced or enlarged, because the curvature radius of the wheel body of the pulley is fixed, if only the pulley is adjusted (the dimension being reduced or enlarged), a situation of the contact surface between the adjusted pulley and the concave part of each of the engaging cams being uneasy to be tightly adjacent, thereby affecting the locking effect, and in the process of being moved so as to be mounted, a noise is easily caused because of the collision, and two ends of the pulley are respectively inserted in a slide hole of the first and the second connection sheet by utilizing a convex column, a situation of the first and the second connection sheet being altered with the pulley can be caused, thereby being inconvenience in use.

In view of the mentioned disadvantages, one primary objective of the present invention is to provide a pin locking dual shaft hinge, in which the technical means of a first connecting member of a connecting support being formed with a penetrated hole and an insertion pin being formed with cut surfaces is provided for adjusting the whole volume of the present invention, and a cut opening is formed on the first connecting member for being communicated with the penetrated hole, so the flexibility for modifying or altering the design become easier, thereby the present invention being suitably to be applied in a small electronic product so as to increase the applicable fields of the present invention.

Another objective of the present invention is to provide a pin locking dual shaft hinge capable of reducing foreign noise, thereby functions of lowering the noise caused by collision and prolonging the service life of a rigid wheel member being provided.

For achieving the aforesaid objectives, the present invention provides two technical solutions. The first technical solution is to provide a pin locking dual shaft hinge, which includes: a connecting support including a main body and a first connecting member, the first connecting member is disposed on a wall surface of the main body and between an upper and a lower end of the main body, the connecting support is formed with a penetrated hole penetrating the first connecting member; a first core shaft pivoted at the upper end of the main body; a first engaging cam sleeved and engaged on the first core shaft and disposed close to the upper opened portion of the penetrated hole, the periphery of the first engaging cam is formed with at least a first engaging part; a second core shaft parallel to the first core shaft and pivoted at the lower end of the main body; a second engaging cam sleeved and engaged on the second core shaft and disposed close to the lower opened portion of the penetrated hole, the periphery of the second engaging cam is formed with at least a second engaging part; and an insertion pin received in the penetrated hole of the connecting support, an upper and a lower end of the insertion pin are respectively corresponding to the first engaging part and the second engaging part, the periphery of the insertion pin is formed with at least a cut surface capable of being tightly adjacent to the wall surface thereby allowing the upper end of the insertion pin to be in contact with the periphery of the first engaging cam in a rotating status and the lower end of the insertion pin to be correspondingly mounted in the second engaging part so as to lock the second engaging cam, or allowing the upper end of the insertion pin to be correspondingly mounted in the first engaging part so as to lock the first engaging cam and the lower end of the insertion pin to be in contact with the periphery of the second engaging cam in a rotating status.

The second technical of the present invention is to provide a pin locking dual shaft hinge, which includes: a connecting support including a main body and a first connecting member, the first connecting member is disposed on a wall surface of the main body and between an upper and a lower end of the main body, the connecting support is formed with a penetrated hole penetrating the first connecting member, and the first connecting member is formed with a cut opening communicated with the penetrated hole; a first core shaft pivoted at the upper end of the main body; a first engaging cam sleeved and engaged on the first core shaft and disposed close to the upper opened portion of the penetrated hole, the periphery of the first engaging cam is formed with at least a first engaging part; a second core shaft parallel to the first core shaft and pivoted at the lower end of the main body; a second engaging cam sleeved and engaged on the second core shaft and disposed close to the lower opened portion of the penetrated hole, the periphery of the second engaging cam is formed with at least a second engaging part; and an insertion pin received in the penetrated hole of the connecting support, an upper and a lower end of the insertion pin are respectively corresponding to the first engaging part and the second engaging part, the periphery of the insertion pin is formed with at least a cut surface capable of being tightly adjacent to the wall surface thereby allowing the upper end of the insertion pin to be in contact with the periphery of the first engaging cam in a rotating status and the lower end of the insertion pin to be correspondingly mounted in the second engaging part so as to lock the second engaging cam, or allowing the upper end of the insertion pin to be correspondingly mounted in the first engaging part so as to lock the first engaging cam and the lower end of the insertion pin to be in contact with the periphery of the second engaging cam in a rotating status.

According to the pin locking dual shaft hinge provided by the present invention, the technical means of the first connecting member of the connecting support being formed with the penetrated hole and the insertion pin being formed with cut surfaces is provided for adjusting the whole volume of the present invention, and the cut opening is formed on the first connecting member for being communicated with the penetrated hole, so the flexibility for modifying or altering the design become easier, thereby the present invention being suitably to be applied in a small electronic product so as to increase the applicable fields of the present invention, and the action order of the dual shaft hinge can be ensured and the rotating stability for the electronic device for being folded or unfolded can be kept.

BRIEF DESCRIPTION OF THE DRAWINGS

The present invention will be apparent to those skilled in the art by reading the following detailed description of a preferred embodiment thereof, with reference to the attached drawings, in which.

DETAILED DESCRIPTION OF THE PREFERRED EMBODIMENT

Figure 1:
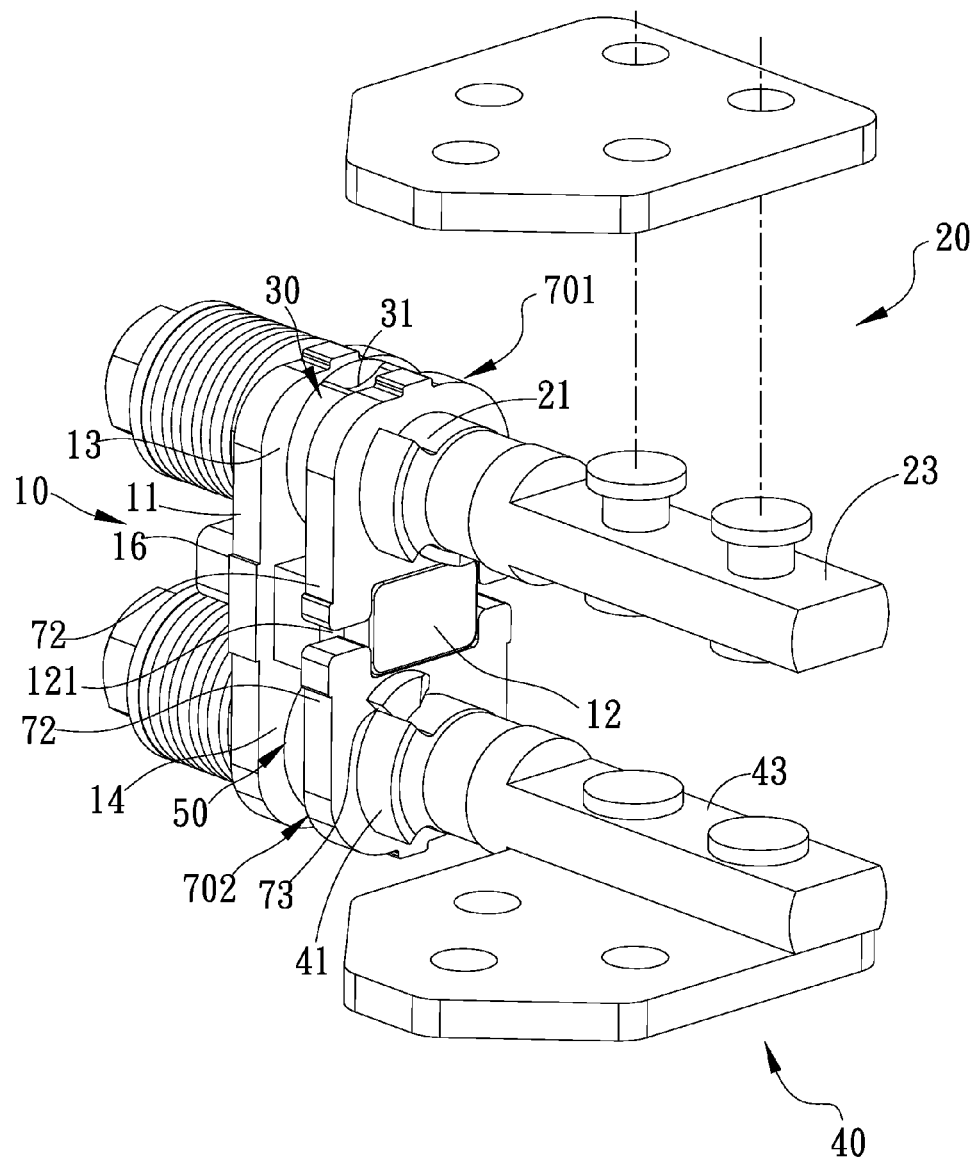
FIG. 1 is a schematic view showing the pin locking dual shaft hinge according to the first embodiment of the present invention.
Figure 2:
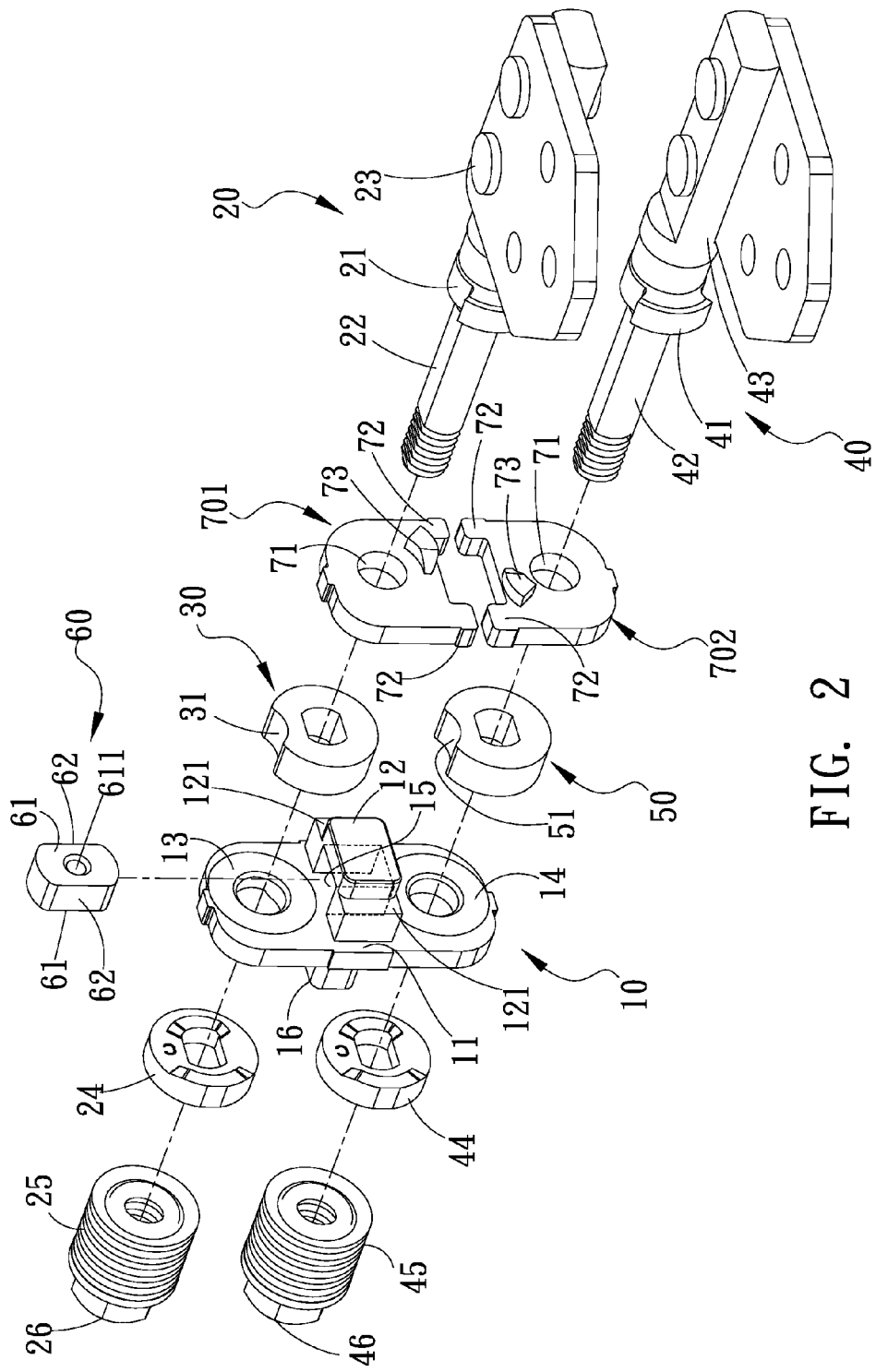
FIG. 2 is a three dimensional exploded view of FIG. 1.
Figure 3:
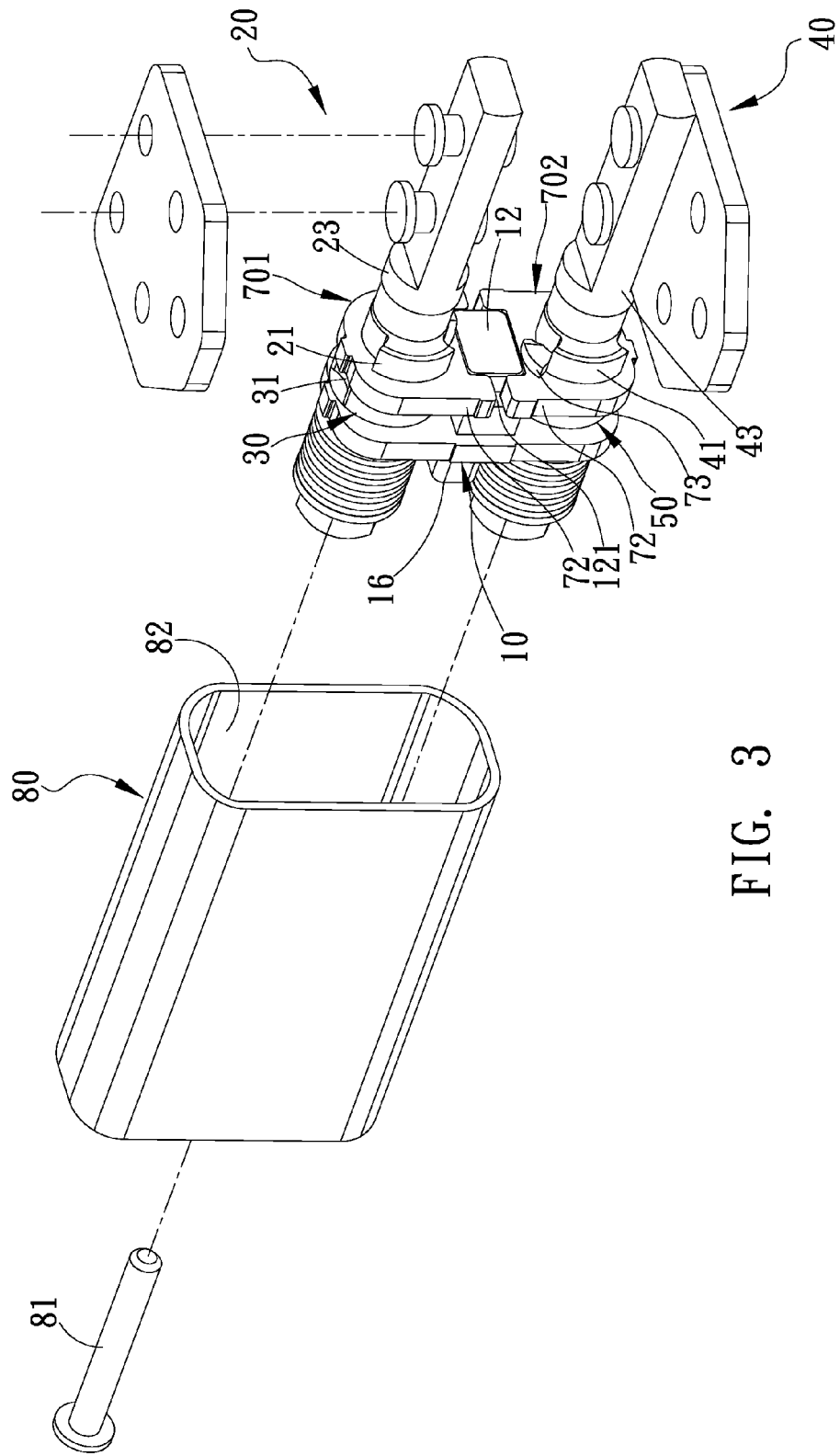
FIG. 3 is a schematic view illustrating the pin locking dual shaft hinge of FIG. 1 being further installed with a housing and a fasten member.
Figure 4:
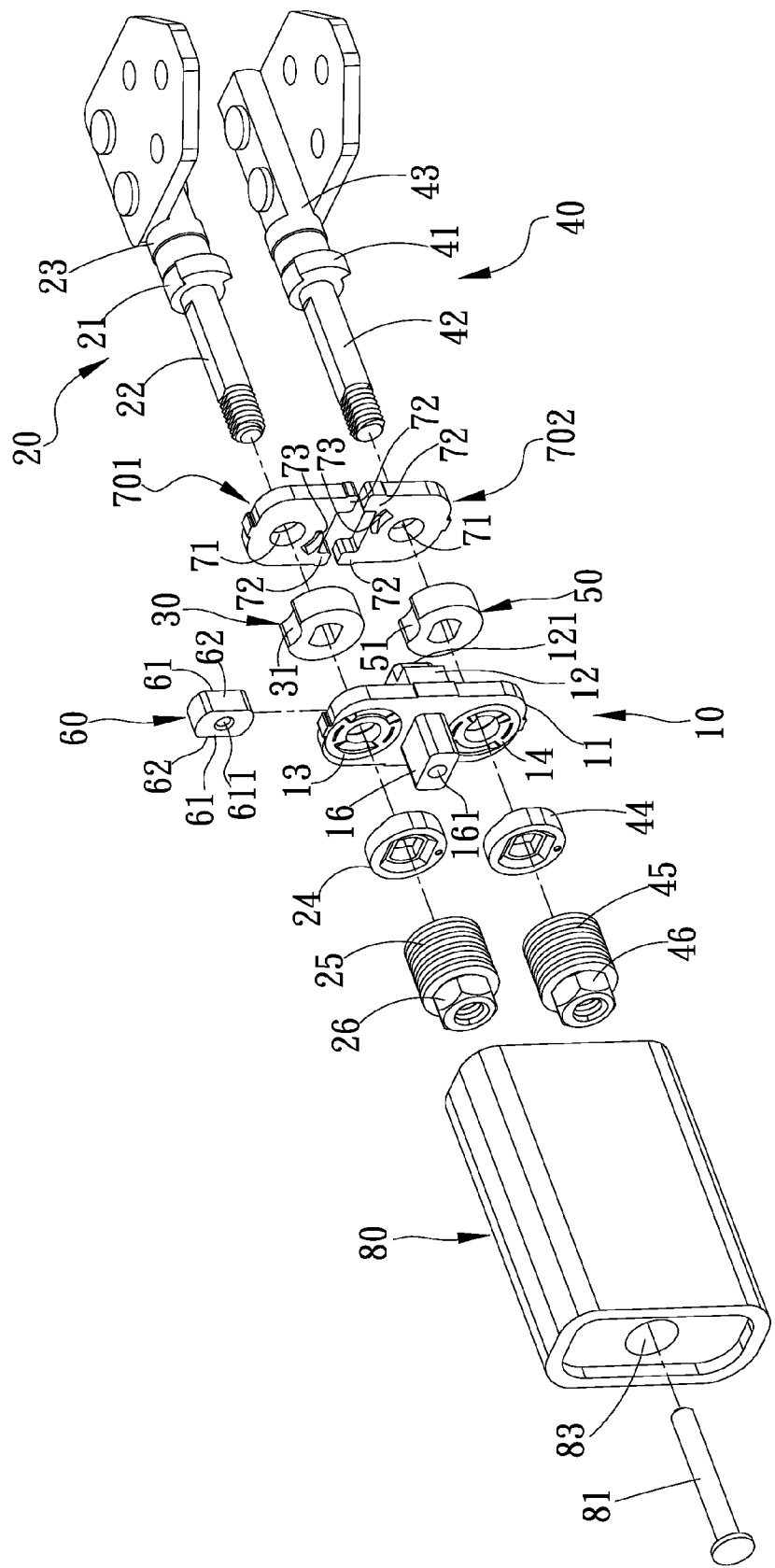
FIG. 4 is a three dimensional exploded view illustrating the pin locking dual shaft hinge of FIG. 3 being viewed from another angle.
Figure 5:
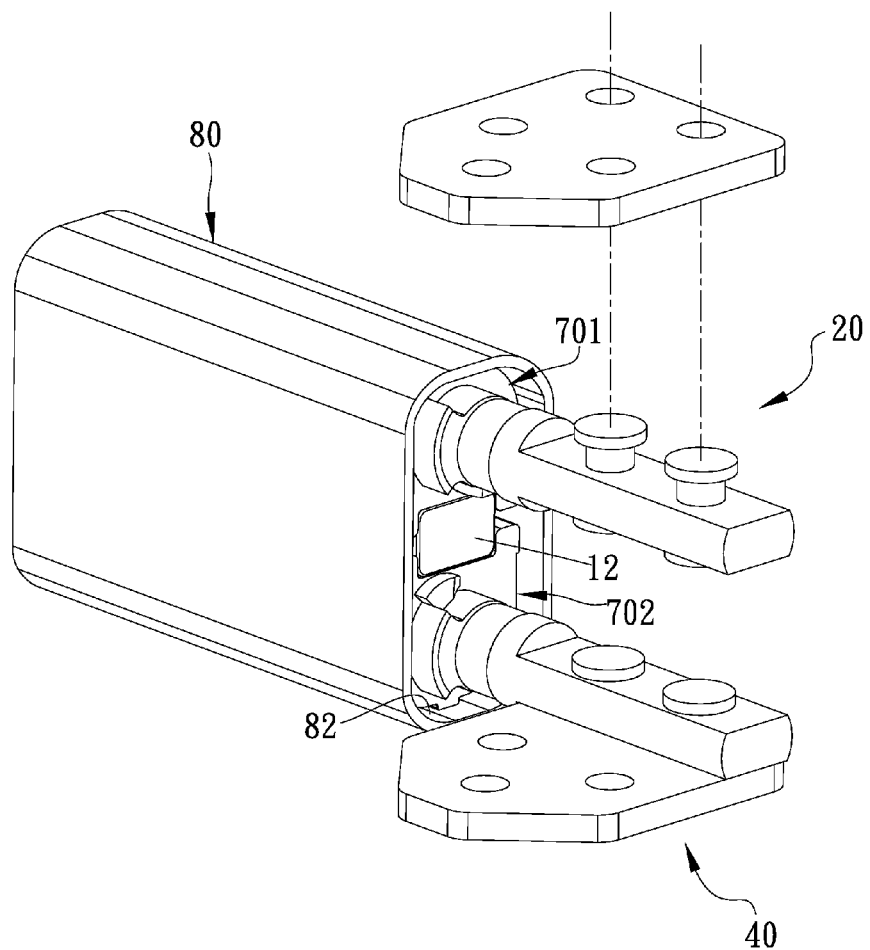
FIG. 5 is a schematic view showing the assembly of the pin locking dual shaft hinge, the housing and the fasten member of FIG. 3.

Referring from FIG. 1 to FIG. 7, according to the first embodiment of the present invention, the pin locking dual shaft hinge includes a connecting support 10, a first core shaft 20, a first engaging cam 30, a second core shaft 40 parallel to the first core shaft 20, a second engaging cam 50 and an insertion pin 60.

The connecting support 10 includes a main body 11 and a first connecting member 12, the first connecting member 12 is formed on a wall surface of the main body 11 and between an upper end 13 and a lower end 14 of the main body 11, the connecting support 10 is formed with a penetrated hole 15 penetrating the first connecting member 12. The first core shaft 20 is pivoted at the upper end 13 of the main body 11. The first engaging cam 30 is sleeved and engaged on the first core shaft 20 and disposed close to the upper opened portion of the penetrated hole 15, the periphery of the first engaging cam 30 is formed with at least a first engaging part 31. The second core shaft 40 is pivoted at the lower end 14 of the main body 11. The second engaging cam 50 is sleeved and engaged on the second core shaft 40 and disposed close to the lower opened portion of the penetrated hole 15, the periphery of the second engaging cam 50 is formed with at least a second engaging part 51. The insertion pin 60 is received in the penetrated hole 15 of the connecting support 10, the upper and the lower end of the insertion pin 60 are respectively corresponding to the first engaging part 31 and the second engaging part 51, the periphery of the insertion pin 60 is formed with at least a cut surface 61 capable of being tightly adjacent to the wall surface thereby allowing the upper end of the insertion pin 60 to be in contact with the periphery of the first engaging cam 30 in a rotating status and allowing the lower end of the insertion pin 60 to be correspondingly mounted in the second engaging part 51 so as to lock the second engaging cam 50, or allowing the upper end of the insertion pin 60 to be correspondingly mounted in the first engaging part 31 so as to lock the first engaging cam 30 and the lower end of the insertion pin 60 to be in contact with the periphery of the second engaging cam 50 in a rotating status.

According to the first embodiment, two locking statuses are formed, a first locking status is defined as the upper end of the insertion pin 60 being in contact with the periphery of the first engaging cam 30 and the lower end of the insertion pin 60 being correspondingly mounted and locked in the second engaging part 51 of the second engaging cam 50; a second locking status is defined as the lower end of the insertion pin 60 being in contact with the periphery of the second engaging cam 50 and the upper end of the insertion pin 60 being correspondingly mounted and locked in the first engaging part 31 of the first engaging cam 30, thereby ensuring the action order of the dual shaft hinge provided by the present invention.

For allowing the upper and the lower end of the insertion pin 60 to be completely adjacent to the first engaging part 31 and the second engaging part 51 as to as facilitate the locking and reducing the affection caused by the design being altered, the present invention adopts the insertion pin 60 instead of a roller (or a pulley), so the whole configuration of the insertion pin 60 is different from that of the roller (or the pulley), and the dimension of the component made is relatively smaller, and the insertion pin 60 is less likely to roll, thereby facilitating the assembly and preventing from being loosened, it is known that the shape of the insertion pin 60 can be designed in a rod columnar shape, but according to the present invention and for reducing the interfere (e.g. self-rotating) caused during the displacement of the insertion pin 60 and for enhancing the stability, the insertion pin 60 is formed with at least a cut surface 61 for preventing rotation and a foolproofing effect is also provided; moreover the volume of the insertion pin 60 can be changed through altering the upper and the lower end while the original locking effect can still be kept, thereby avoiding a situation of a gap being generated after the volume being changed and causing a problem of incomplete engagement; on the other hand, for increasing the applicable fields, the first and the second engaging part and the upper and the lower end of the insertion pin 60 which are corresponding to each other can be formed in a corresponding arc shape (e.g. convex arc shape and concave arc shape), conical shape (e.g. convex conical shape and concave conical shape), or the upper and the lower end of the insertion pin 60 are respectively formed in the conical shape and the arc shape, and the first and the second engaging part 31, 51 are respectively formed with the corresponding shape thereby allowing the complete engagement to be carried out.

The present invention further includes two position limiting fasten sheets 701, 702, each of the position limiting fasten sheets 701, 702 is respectively formed with a pivot hole 71 and two buckle parts 72, the periphery of the first connecting member 12 is formed with two buckle slots 121, the two buckle parts 72 of the two position limiting fasten sheets 701, 702 are respectively buckled with the two buckle slots 121 thereby allowing the position limiting fasten sheets 701, 702 to be respectively disposed at two opposite ends of the first connecting member 12 so as to form a symmetrical status for reducing the volume, and the first core shaft 20 and the second core shaft 40 arranged in parallel are enabled to be respectively pivoted in the pivot hole 71 of each of the position limiting fasten sheets 701, 702; one wall surface of each of the position limiting fasten sheets 701, 702 is respectively formed with a stop piece 73, the first core shaft 20 and the second core shaft 40 are respectively formed with a first stop part 21 and a second stop part 41 working with the stop piece 73 for limiting the rotation stroke. In addition, the first core shaft 20 is further provided with a non-circular first rod member 22 and a first fasten part 23 used for being assembled and fastened, the first rod member 22 and the first fasten part 23 are respectively disposed at two ends of the first stop part 21; the second core shaft 40 is further provided with a non-circular second rod member 42 and a second fasten part 43 used for being assembled and fastened, the second rod member 42 and the second fasten part 43 are respectively disposed at two ends of the second stop part 41.

The at least one cut surface 61 of the insertion pin 60 is further formed with two cut surfaces 61, each of the cut surfaces 61 is formed through cutting from the upper end of the insertion pin 60 to the lower end of the insertion pin 60, wherein the whole insertion pin 60 is in a substantially flat status through the two cut surfaces 61 being respectively formed at two opposite sides of the insertion pin 60, thereby allowing the whole volume of the present invention to be reduced; and for allowing each of the cut surfaces 61 to be flat, any bump formed on each of the cut surfaces 61 is removed, and each of the cut surfaces 61 is formed with a concave part 611, so the two cut surfaces 61 of the insertion pin 60 are enabled to be respectively adjacent to a wall surface of the main body 11 and adjacent to the corresponding inner wall of the penetrated hole 15, what shall be addressed is that the scope of the present invention is not limited to the mentioned arrangement, in actual practice, each of the cut surfaces 61 is affected by the location of the penetrated hole 15, or can be respectively adjacent to two inner wall surfaces of the penetrated hole 15; the concave part 611 of each of the cut surfaces 61 can also be formed as two opposite opened portions of a penetrated hole.

Moreover, the periphery of the insertion pin 60 defined between the upper and the lower end is further formed with two plane surfaces 62, each of the plane surfaces 62 is staggeringly arranged with each of the cut surfaces 61 thereby preventing the insertion pin 60 from being tilted and facilitating the stable movement.

Figure 6:
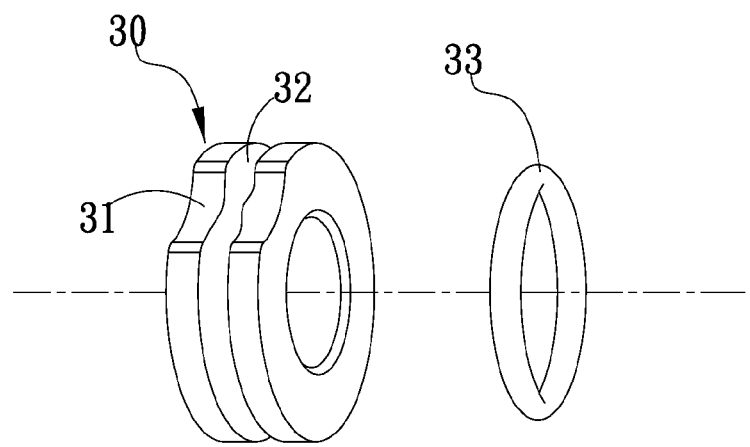
FIG. 6 is a three dimensional view illustrating the first engaging cam being further formed with an annular groove and a rubber ring.
Figure 7:
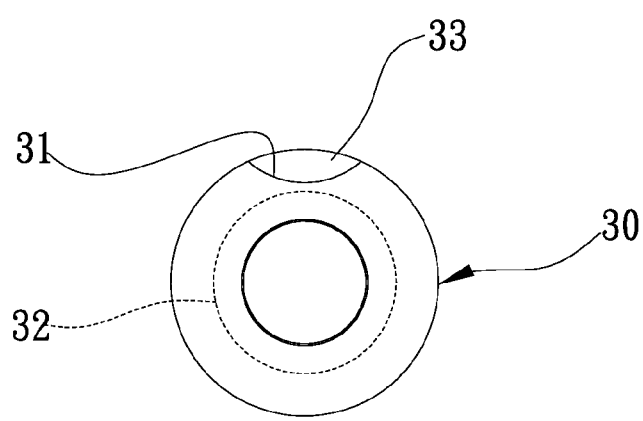
FIG. 7 is a perspective view showing the assembly of the first engaging cam, the annular groove and the rubber ring of FIG. 6.

As shown in FIG. 6 and FIG. 7, the first engaging part 31 is formed as a notch penetrating two wheel surfaces of the first engaging cam 30 (i.e. extending from one wheel surface to another wheel surface of the first engaging cam), the second engaging part 51 is formed as a notch penetrating two wheel surfaces of the second engaging cam 50 (i.e. extending from one wheel surface to another wheel surface of the second engaging cam, not shown in figures but the structure thereof being the same as the first engaging cam), the periphery of the first engaging cam 30 and the periphery of the second engaging cam 50 are respectively formed with an annular groove 32 and a rubber ring 33 positioned in the annular groove 32 thereby preventing the rubber ring 33 from being loosened; each of the notches is shallower than each of the annular grooves 32 (i.e. the depth of the notch being concavely formed at the periphery of the engaging cam being shallower than the depth of each of the annular grooves), thereby allowing each of the rubber rings 33 to be respectively received in each of the annular grooves 32 and respectively forming a buffer layer in the first engaging part 31 and the second engaging part 51, so when the upper and the lower end of the insertion pin 60 is respectively mounted in the engaging part of each of the engaging cams, effects of lowering the noise caused by collision and increasing the friction are provided, and the rigid insertion pin is protected from directly colliding with the rigid engaging cam thereby preventing the insertion pin from being damaged and prolonging the service life thereof.

The first core shaft 20 and the second core shaft 40 are respectively sleeved and engaged with a first latching cam 24 and a second latching cam 44 disposed at the upper and the lower end of the main body 11, and opposite wall surfaces of the main body 11 are respectively in contact with a wheel surface of the first latching cam 24 and a wheel surface of the second latching cam 44, the first core shaft 20 is further provided with a first elastic unit 25 and a first cap 26, the second core shaft 40 is further provided with a second elastic unit 45 and a second cap 46, so when the first core shaft 20 and/or the second core shaft 40 is rotated, an action of latching/releasing is respectively formed through the first latching cam 24 and the second latching cam 44 and the upper and the lower end 13, 14 of the main body 11.

In addition, the present invention further includes a housing 80 and a fasten member 81, two opposite ends of the housing 80 are respectively formed with an accommodation slot 82 and a through hole 83 communicated with the accommodation slot 82, a second connecting member 16 is formed on an opposite wall of the main body 11 corresponding to the first connecting member 12, the second connecting member 16 is formed with a connection hole 161, the fasten member 81 is passed the through hole 83 of the housing 80 and received (e.g. being screwed) in the connection hole 161 of the second connecting member 16, thereby allowing the connecting support 10, the first rod member 22, the first latching cam 24, the first elastic unit 25, the first cap 26, the first engaging cam 30, the second rod member 42, the second latching cam 44, the second elastic unit 45, the second cap 46, the second engaging cam 50, the insertion pin 60 and each of the position limiting fasten sheets 701, 702 to be accommodated in the accommodation slot 82, and the edge of each of the position limiting fasten sheets 701, 702 and the edge of the main body 11 are all formed with plural protrusions thereby being facilitated to be fastened in the accommodation slot 82.

Figure 8:
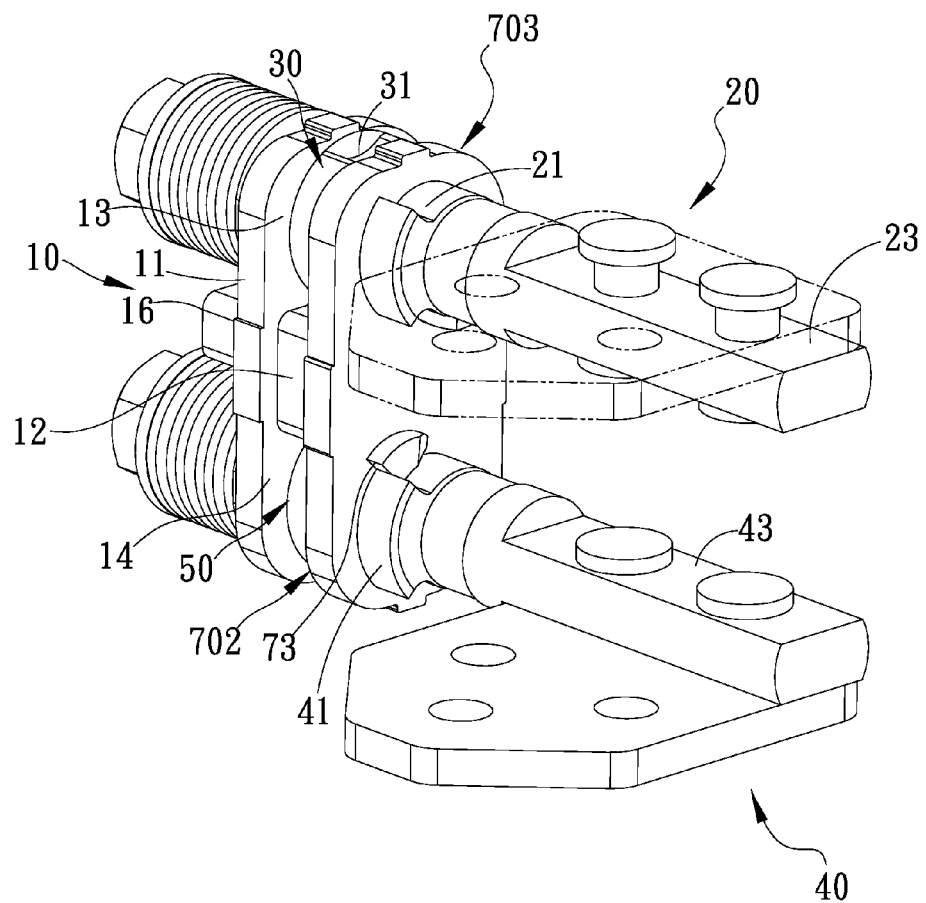
FIG. 8 is a schematic view showing the pin locking dual shaft hinge according to the second embodiment of the present invention.
Figure 9:
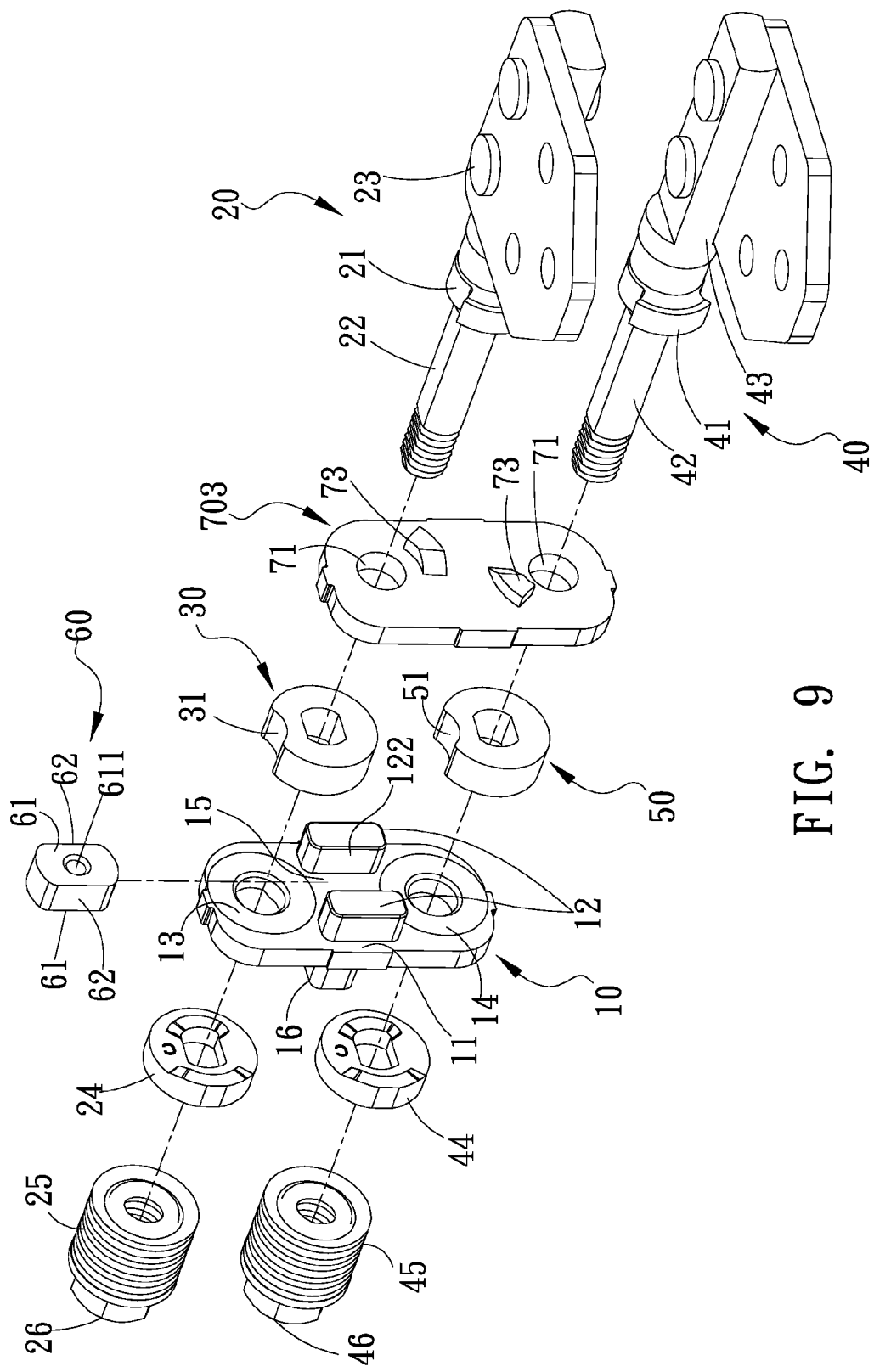
FIG. 9 is a three dimensional exploded view of FIG. 8.
Figure 10:
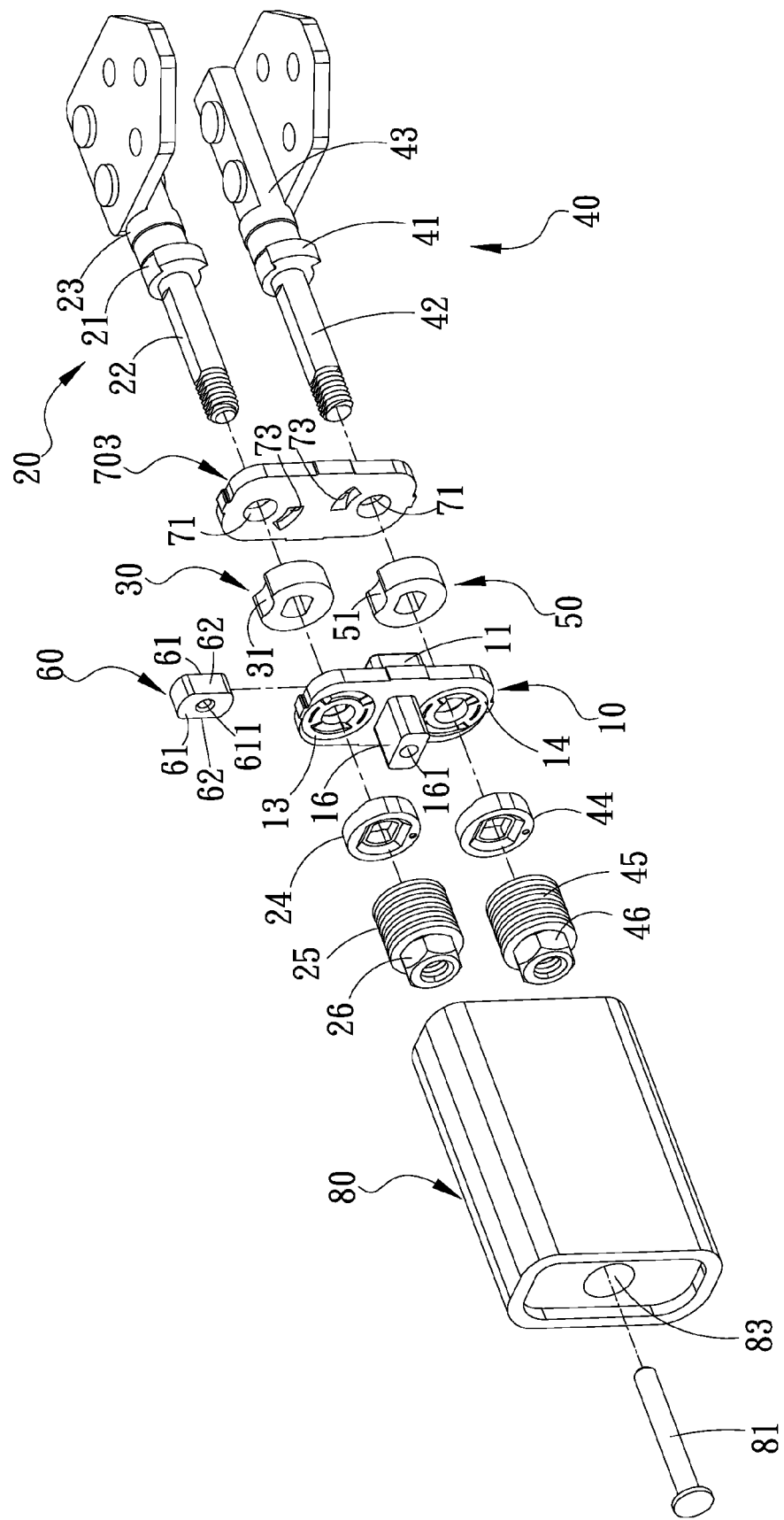
FIG. 10 is a schematic view illustrating the pin locking dual shaft hinge of FIG. 9 being further provided with a housing and a fasten member.

Referring from FIG. 8 to FIG. 10, the difference between the pin locking dual shaft hinge provided by the second embodiment and the first embodiment is that a cut opening 122 communicated with the penetrated hole 15 is formed at the location where the first connecting member 12 being provided on the connecting support 10, thereby allowing one cut surface 61 of the insertion pin 60 to be tightly adjacent to one wall surface of the main body 11 and another cut surface

61 to be corresponding to the cut opening 122 of the first connecting member 12; and single position limiting fasten sheet 703 is adopted for replacing the two position limiting fasten sheets 701, 702 disclosed in the first embodiment, thereby allowing the position limiting fasten sheet 703 to be abutted against the first connecting member 12 and the another cut surface 61 to be tightly adjacent to a wall surface of the position limiting fasten sheet 703, an effect of reducing the whole volume is provided, and the upper and the lower end of the position limiting fasten sheet 703 is respectively formed with a pivot hole 71, the first core shaft 20 and the second core shaft 40 arranged in parallel are respectively pivoted in each of the pivot holes 71 of the position limiting fasten sheet 703; wall surfaces at the upper and the lower end of the position limiting fasten sheet 703 are respectively formed with a stop piece 73 which can be served to generate a stopping effect respectively with the first stop part 21 of the first core shaft 20 and the second stop part 41 of the second core shaft 40.

According to the second embodiment, a main function of reducing the whole volume is provided, because the another cut surface 61 of the insertion pin 60 is corresponding to the cut opening 122 of the first connecting member 12, when in actual practice, an engaging status or a releasing status can be formed between the another cut surface 61 and the position limiting fasten sheet 703 through adjusting the dimension of the cut opening 122 so as to reduce or increase the whole volume of the present invention. Accordingly, the pin locking dual shaft hinge provided by the present invention is able to be applied in various electronic products.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific examples of the embodiments disclosed and that modifications and other embodiments are intended to be included within the scope of the appended claims. Although specific terms are employed herein, they are used in a generic and descriptive sense only and not for purposes of limitation.

What is claimed is:

1. A pin locking dual shaft hinge, including:
   a connecting support, including a main body and a first connecting member, said first connecting member being disposed on a wall surface of said main body and between an upper and a lower end of said main body, said connecting support being formed with a penetrated hole penetrating said first connecting member;
   a first core shaft, pivoted at said upper end of said main body;
   a first engaging cam, sleeved and engaged on said first core shaft and disposed close to an upper opened portion of said penetrated hole, the periphery of said first engaging cam being formed with at least a first engaging part;
   a second core shaft, parallel to said first core shaft and pivoted at said lower end of said main body;
   a second engaging cam, sleeved and engaged on said second core shaft and disposed close to a lower opened portion of said penetrated hole, the periphery of said second engaging cam being formed with at least a second engaging part; and
   an insertion pin, received in said penetrated hole of said connecting support, an upper and a lower end of said insertion pin being respectively corresponding to said first engaging part and second engaging part, the periphery of said insertion pin being formed with at least one cut surface capable of being tightly adjacent to the wall surface thereby allowing the upper end of said insertion pin to be in contact with the periphery of said first engaging cam in a rotating status and the lower end of said insertion pin to be correspondingly mounted in said second engaging part so as to lock said second engaging cam, or allowing the upper end of said insertion pin to be correspondingly mounted in said first engaging part so as to lock said first engaging cam and the lower end of said insertion pin to be in contact with the periphery of said second engaging cam in a rotating status.

2. The pin locking dual shaft hinge as claimed in claim 1, wherein said at least one cut surface of said insertion pin is further formed with two cut surfaces, each of said cut surfaces is formed through cutting from the upper end of said insertion pin to the lower end of said insertion pin, and each of said cut surfaces is formed with a concave part, so each of said cut surfaces is enabled to be respectively adjacent to a wall surface of said main body and adjacent to the corresponding inner wall of said penetrated hole.

3. The pin locking dual shaft hinge as claimed in claim 1, further including two position limiting fasten sheets, each of said position limiting fasten sheets is formed with a pivot hole and two buckle parts, the periphery of said first connecting member is formed with two buckle slots, said two buckle parts of said two position limiting fasten sheets are respectively buckled with said two buckle slots thereby allowing said position limiting fasten sheets to be respectively disposed at two opposite ends of said first connecting member so as to form a symmetrical status, and said first core shaft and said second core shaft arranged in parallel are respectively pivoted in said pivot hole of each of said position limiting fasten sheets.

4. The pin locking dual shaft hinge as claimed in claim 1, wherein said at least one cut surface of said insertion pin is further formed with two cut surfaces, the periphery of said insertion pin defined between the upper and the lower end thereof is further formed with two plane surfaces, each of said plane surfaces is staggeringly arranged with each of said cut surfaces.

5. The pin locking dual shaft hinge as claimed in claim 1, wherein said first engaging part is formed as a notch penetrating two opposite surfaces of said first engaging cam, said second engaging part is formed as a notch penetrating two opposite surfaces of said second engaging cam, the periphery of said first engaging cam and the periphery of said second engaging cam are respectively formed with an annular groove and a rubber ring positioned in said annular groove.

6. The pin locking dual shaft hinge as claimed in claim 5, wherein each of said notches is shallower than each of said annular grooves, thereby allowing each of said rubber rings to be respectively received in each of said annular grooves and respectively forming a buffer layer in said first engaging part and said second engaging part.

7. The pin locking dual shaft hinge as claimed in claim 1, further including a housing and a fasten member, two opposite ends of said housing are respectively formed with an accommodation slot and a through hole communicated with said accommodation slot, a second connecting member is formed on an opposite wall of said main body corresponding to said first connecting member, said second connecting member is formed with a connection hole, said fasten member is passed said through hole of said housing and received in said connection hole of said second connecting member.

8. A pin locking dual shaft hinge, including:
a connecting support, including a main body and a first connecting member, said first connecting member being disposed on a wall surface of said main body and between an upper and a lower end of said main body, said connecting support being formed with a penetrated hole penetrating said first connecting member, and said first connecting member being formed with a cut opening communicated with said penetrated hole;
a first core shaft, pivoted at said upper end of said main body;
a first engaging cam, sleeved and engaged on said first core shaft and disposed close to an upper opened portion of said penetrated hole, the periphery of said first engaging cam being formed with at least a first engaging part;
a second core shaft, parallel to said first core shaft and pivoted at said lower end of said main body;
a second engaging cam, sleeved and engaged on said second core shaft and disposed close to a lower opened portion of said penetrated hole, the periphery of said second engaging cam being formed with at least a second engaging part; and
an insertion pin, received in said penetrated hole of said connecting support, an upper and a lower end of said insertion pin being respectively corresponding to said first engaging part and said second engaging part, the periphery of said insertion pin being formed with at least one cut surface capable of being tightly adjacent to the wall surface thereby allowing the upper end of said insertion pin to be in contact with the periphery of said first engaging cam in a rotating status and the lower end of said insertion pin to be correspondingly mounted in said second engaging part so as to lock said second engaging cam, or allowing the upper end of said insertion pin to be correspondingly mounted in said first engaging part so as to lock said first engaging cam and the lower end of said insertion pin to be in contact with the periphery of said second engaging cam in a rotating status.

9. The pin locking dual shaft hinge as claimed in claim 8, wherein said at least one cut surface of said insertion pin is further formed with two cut surfaces, each of said cut surfaces is formed through cutting from the upper end of said insertion pin to the lower end of said insertion pin, and each of said cut surfaces is formed with a concave part, so one cut surface of said insertion pin is enabled to be adjacent to a wall surface of said main body and another cut surface is enabled to be corresponding to said cut opening of said first connecting member.

10. The pin locking dual shaft hinge as claimed in claim 8, further including a position limiting fasten sheet abutted against said first connecting member, the upper and the lower end of said position limiting fasten sheet is respectively formed with a pivot hole, said first core shaft and said second core shaft arranged in parallel are respectively pivoted in each of said pivot holes of said position limiting fasten sheet.

11. The pin locking dual shaft hinge as claimed in claim 8, wherein said at least one cut surface of said insertion pin is further formed with two cut surfaces, the periphery of said insertion pin defined between the upper and the lower end thereof is further formed with two plane surfaces, each of said plane surfaces is staggeringly arranged with each of said cut surfaces.

12. The pin locking dual shaft hinge as claimed in claim 8, wherein said first engaging part is formed as a notch penetrating two opposite surfaces of said first engaging cam, said second engaging part is formed as a notch penetrating two opposite surfaces of said second engaging cam, the periphery of said first engaging cam and the periphery of said second engaging cam are respectively formed with an annular groove and a rubber ring positioned in said annular groove.

13. The pin locking dual shaft hinge as claimed in claim 12, wherein each of said notches is shallower than each of said annular grooves, thereby allowing each of said rubber rings to be respectively received in each of said annular grooves and respectively forming a buffer layer in said first engaging part and said second engaging part.

14. The pin locking dual shaft hinge as claimed in claim 8, further including a housing and a fasten member, two opposite ends of said housing are respectively formed with an accommodation slot and a through hole communicated with said accommodation slot, a second connecting member is formed on an opposite wall of said main body corresponding to said first connecting member, said second connecting member is formed with a connection hole, said fasten member is passed said through hole of said housing and received in said connection hole of said second connecting member.

\* \* \* \* \*